United States Patent [19]
Stearns

[11] Patent Number: 6,068,904
[45] Date of Patent: May 30, 2000

[54] PORTABLE AREA FLOOR COVERING AND METHOD

[76] Inventor: Christopher W. Stearns, 1308 Factory Pl, Box #60, Los Angeles, Calif. 90013

[21] Appl. No.: 09/249,997

[22] Filed: Feb. 16, 1999

[51] Int. Cl.[7] .................................................. B32B 3/08
[52] U.S. Cl. ............................... 428/45; 428/47; 428/81; 52/177
[58] Field of Search .................................. 428/45, 47, 77, 428/81; 15/215; 52/177, 181, 390

[56] References Cited

U.S. PATENT DOCUMENTS

| | | | |
|---|---|---|---|
| 4,245,689 | 1/1981 | Grard et al. | 162/134 |
| 4,501,783 | 2/1985 | Hiragami et al. | 428/147 |
| 5,604,290 | 2/1997 | Aikawa et al. | 524/529 |

*Primary Examiner*—Alexander Thomas
*Attorney, Agent, or Firm*—John S. Christopher

[57] ABSTRACT

A portable area floor covering and method is directed to a floor covering that is durable yet sufficiently flexible to facilitate portability, exhibits a robust construction and a very attractive and aesthetically pleasing appearance for use in residential and commercial environments. In its most fundamental embodiment, the portable area floor covering comprises a construction including a durable, flexible sheet layer formed of a plurality of sheet sections wherein each sheet section includes a plurality of outer edges. A flexible base layer is affixed to a bottom side of each of the sheet sections to form a backing for the durable, flexible sheet layer. A border reducer is fused to the flexible base layer and to the outer edges of the sheet sections. The border reducer is wedge-shaped which facilitates interfacing with a floor surface. Finally, a padding layer is secured to a bottom side of the flexible base layer to provide cushioning to the entire portable area floor covering. In lieu of the multiple sheet sections, the flexible sheet layer can be formed from a single continuous sheet section.

12 Claims, 2 Drawing Sheets

PORTABLE AREA FLOOR COVERING AND METHOD

BACKGROUND OF THE INVENTION

1. Field of the Invention

The present invention relates to floor coverings. More specifically, the present invention relates to methods and apparatus for an area floor covering that is durable yet sufficiently flexible to facilitate portability, and exhibits a robust construction and a very attractive and aesthetically pleasing appearance for use in residential and commercial environments.

2. Description of the Related Art

The relevant art is directed to floor coverings for residential and commercial applications. Floor coverings generally fall into two separate categories which include those that are not intended to be permanently installed and those that are intended to be permanently installed.

Floor coverings that are not intended to be permanently installed include a variety of floor mats, area rugs, throw rugs, and the like. This category also includes expensive rugs and carpets typically produced in Persia and China that are often positioned on the floor at the center of the room to provide an aesthetically pleasing appearance. These types of non-permanently installed floor coverings tend to be flexible and movable but are not necessarily durable since they typically wear out with continued use.

Further, the non-permanently installed type of floor covering is typically not stain resistant, does not incorporate an anti-skid feature on the bottom thereof, does not include a border that interfaces with the floor to reduce the risk of tripping as a safety feature, and is limited in size, shape and color availability. Often, this type of floor covering is not resistant to high foot traffic and the dirt and grime associated therewith and is not easily maintained and cleaned. The smaller area rugs can often be laundered in machines, however, successive machine washing and drying contributes to the wear and tear of the floor covering. Likewise, the more expensive area rugs and carpets must be dry cleaned (as opposed to machine washing and drying) which can be very expensive.

The second general category of floor coverings include the permanently installed type. Permanently installed is defined such that the floor covering, once installed, is intended to remain in place for the life of the floor covering. This category includes a plurality of floor coverings permanently installed directly over hard wood surfaces or concrete slabs. This category of floor coverings can include, for example, wall-to-wall carpet, area carpets permanently attached to the floor surface or concrete slab, and various types of hard tile and/or semi-flexible tile and wood like tile coverings that are cemented with adhesives or otherwise permanently attached to the base floor.

Although some of these permanently installed floor coverings are durable and stain resistant, they typically are not portable and flexible such that they can be rolled-up and moved to another location. Further, several of the permanently installed floor coverings, i.e., typically tile-type floor coverings, do not suppress sound or provide cushioning to the feet and legs and do not exhibit anti-skid properties to avoid slip and fall type accidents. Additionally, the permanently installed tile-type floor coverings tend to accumulate dirt and dust and consequently require constant cleaning. Further, since permanently installed floor coverings are usually mass produced, they often are not available in attractive nonsymmetrical, geometrically-shaped designs and eye-catching colors.

Thus, there is a need in the art for a portable area floor covering that is flexible to facilitate the portability, is durable yet provides sound suppression, cushioning to the feet and legs and anti-skid properties, can incorporate custom geometrically-shaped designs which are attractive yet resistant to stains and spills, and includes a wedge-shaped border as a safety feature.

SUMMARY OF THE INVENTION

Briefly, and in general terms, the present invention provides a new and improved portable area floor covering typically used in residential and commercial environments. The novel and non-obvious portable area floor covering exhibits a durable, robust lightweight design which is flexible to facilitate portability, improves cushioning and sound suppression, is stain resistant, exhibits anti-skid properties and a wedge-shaped border that interfaces with the floor surface, and a very attractive and aesthetically pleasing appearance.

The inventive portable area floor covering includes an upper sheet layer that exhibits durability and flexibility and can be comprised of a plurality of sheet sections. The sheet sections can be formed in any desirable geometric shape such as rectangles and/or squares with other geometric designs formed within the boundaries of the rectangles and squares. The sheet sections can be comprised of a material known in the art such as, for example, Forbo Marmoleum Real(™), a type of Linoleum(R). The sheet sections can be fused to a flexible base material such as a vinyl layer which functions as a back support to the sheet sections. Fused to the flexible base material and to the outer edges of the upper sheet layer is a rubberized wedge-shaped border reducer that interfaces with a floor surface. A foam padding layer is then secured to the bottom of the flexible base material to provide cushioning to the portable area floor covering.

The portable area floor covering of the present invention is generally directed to a floor covering that is durable yet sufficiently flexible to facilitate portability, exhibits a robust construction and a very attractive and aesthetically pleasing appearance for use in residential and commercial environments. In its most fundamental embodiment, the portable area floor covering comprises a construction including a durable, flexible sheet layer formed of a plurality of sheet sections wherein each sheet section includes a plurality of outer edges. A flexible base layer is affixed to a bottom side of each of the sheet sections to form a backing for the durable, flexible sheet layer. A border reducer is fused to the flexible base layer and to the outer edges of the sheet sections. The border reducer is wedge-shaped which facilitates interfacing with a floor surface. Finally, a padding layer is secured to a bottom side of the flexible base layer to provide cushioning to the entire portable area floor covering.

In a preferred embodiment, the durable flexible sheet layer can be comprised of the durable surfacing material known as Forbo Marmoleum Real(™), a type of Linoleum(R) while the flexible base layer can be comprised of vinyl or other suitable plastic material. The wedge-shape border reducer, which interfaces with a floor surface to minimize the risk of tripping, is comprised of a rubberized material. Finally, the padding layer positioned underneath the flexible base layer can be comprised of foam rug padding or an equivalent material. This feature enables the portable area floor covering of the present invention to be useful as an anti-fatigue floor covering (for use in areas where workers stand for many hours). The portable area floor covering is also available in a model in which the durable, flexible sheet layer is formed from a single continuous sheet section in lieu of multiple sheet sections.

These and other objects and advantages of the present invention will become apparent from the following more detailed description, taken in conjunction with the accompanying drawings which illustrate the invention, by way of example.

DESCRIPTION OF THE INVENTION

The present invention is a portable area floor covering 100 and method therefore as shown in FIGS. 1–5. The portable area floor covering 100 of the present invention is durable yet sufficiently flexible to facilitate portability so that it can be easily and conveniently relocated. The floor covering 100 exhibits a robust construction as it is comprised of high quality materials. Further, the area floor covering 100 exhibits a very attractive and aesthetically pleasing appearance, resists staining and suppresses noise so that it is ideal for use in residential and commercial environments.

Figure 1:
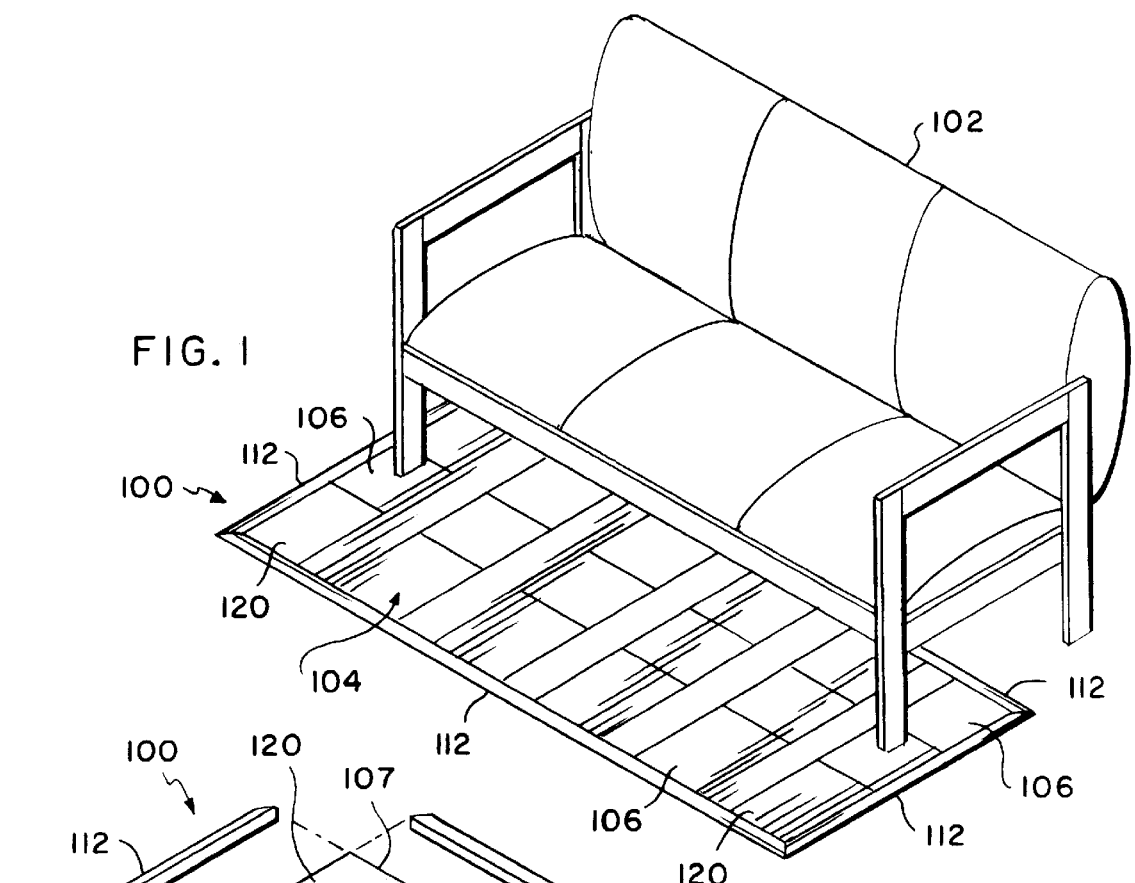
FIG. 1 is a top perspective view of a portable area floor covering of the present invention showing the top surface of a plurality of tile sections and a surrounding border, the invention illustrated in a suitable environment.
Figure 2:
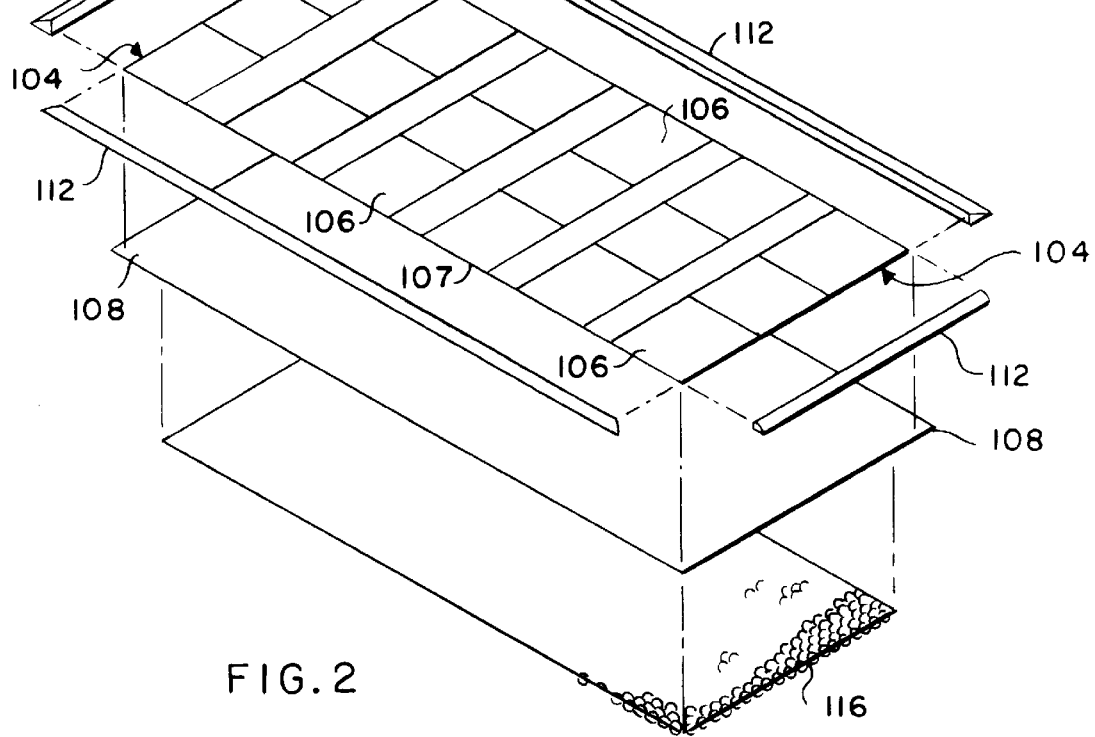
FIG. 2 is an exploded view of the portable area floor covering showing the top surface of the plurality of tile sections, the border separated from the lateral edges of the tile sections, a backing or slip sheet positioned beneath the tile sections and a bottom pad located underneath the slip sheet.
Figure 3:
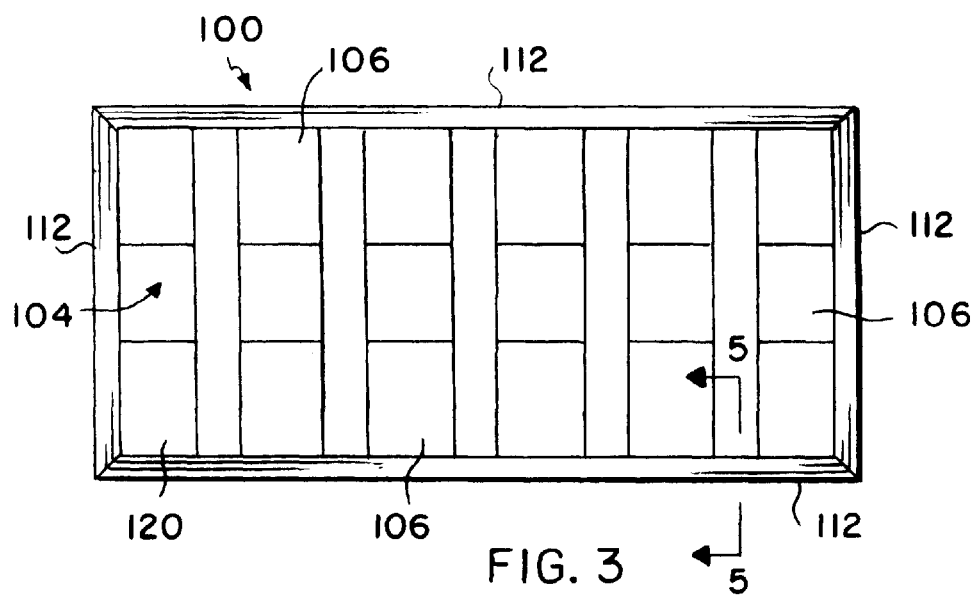
FIG. 3 is a top planar view of the portable area floor covering showing the plurality of tile sections surrounded by the border affixed to the perimeter of the area floor covering.
Figure 4:
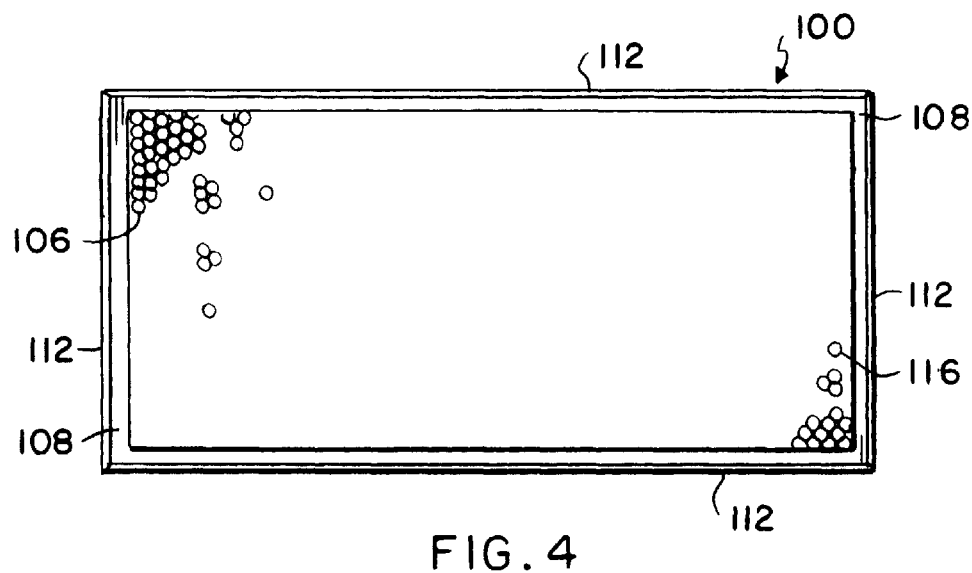
FIG. 4 is a bottom planar view of the portable area floor covering showing the underneath surface of the bottom pad.
Figure 5:
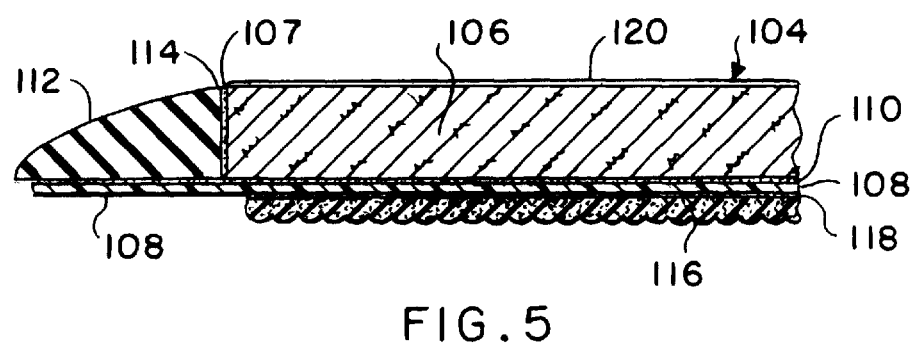
FIG. 5 is a cross-sectional view of the portable area floor covering taken along line 5—5 of FIG. 3 and showing the tile section abutted against the border with both mounted upon the backing or slip sheet which is positioned over top the bottom pad.

A preferred embodiment of the portable area floor covering 100 is best shown in FIGS. 1 and 2 and also in FIGS. 3–5. The floor covering 100 is shown in combination with a furniture piece 102 typically found in residential and commercial environments as illustrated in FIG. 1. However, the floor covering 100 could also be located inside or outside of a building doorway or other suitable location.

The floor covering 100 includes a durable flexible sheet layer 104 which is the upper most surface of the floor covering 100 as is shown in FIG. 1. The flexible sheet layer 104 can include a plurality of sheet sections 106 each having a plurality of outer edges 107 as shown in exploded FIG. 2. The sheet sections 106 can be formed in any of a plurality of geometric designs such as, for example, rectangles, squares or any other attractive imaginable design that will suitably fit within the perimeter of the flexible sheet layer 104. For example, a particular sheet section 106 could exhibit an outer rectangular shape but also include additional colorful diagonal or even circular designs that are hand cut and assembled to form the outer rectangular shape of the particular sheet section 106.

However, it is also important to note that the flexible sheet layer 104 can also be comprised of a single sheet section (i.e., the single sheet section is the flexible sheet layer 104) in lieu of the plurality of sheet sections 106. In other words, the flexible sheet layer 104 can be formed from the cumulative sum of all the sheet sections 106 or, in the alternative, the flexible sheet layer 104 can be comprised of a single sheet of suitable material. Either of these conditions are adequately illustrated in FIGS. 1–3 enclosed herewith with each exhibiting the plurality of outer edges 107. Notwithstanding, the single sheet section (which is the sheet layer 104) can exhibit the attractive geometric designs utilized by the plurality of sheet sections 106. The only distinctions between the two constructions of the flexible sheet layer 104 is that (a) when employing the plurality of sheet sections 106, the geometric designs can be cut and assembled by hand, and (b) when employing the single sheet section to form the flexible sheet layer 104, the geometric designs can be emboldened, painted, printed, etc. directly onto the single flexible sheet layer 104.

Throughout the remainder of this description, it will be assumed that the flexible sheet layer 104 is comprised of the plurality of sheet sections 106. Notwithstanding whether the flexible sheet layer 104 is formed from the plurality of sheet sections 106 or exhibits a single sheet section, the material employed in either case can be the same. A material that is suitable for use in forming the plurality of sheet sections 106 (and the flexible sheet layer 104) is known in the art as Forbo Marmoleum Real(™), a type of Linoleum$^{(R)}$ sheet good known in the art. This family of Linoleum$^{(R)}$ sheet goods is typically defined in The American Heritage Dictionary, 2nd Ed., pg. 734, copyright 1976 as a durable washable material made in sheets by pressing a mixture of heated linseed oil, rosin, powdered cork and pigments over a burlap or canvas backing. In a preferred embodiment, the Forbo Marmoleum Real(™) employed to form the sheet sections 106 typically exhibits a dimension of 2.0 millimeter gauge. Forbo Marmoleum Real(™) is manufactured in Holland but can be obtained from a retail outlet known as Linoleum$^{(R)}$ City in Hollywood, Calif.

The bottom side of each of the sheet sections 106 (or the single sheet section when utilized) is affixed to a flexible base layer 108 best shown in FIG. 5 but is also shown in the exploded view of FIG. 2. The base layer 108 can be formed in a rectangular shape wherein the length and width of the base layer 108 is somewhat larger than the corresponding dimensions of the rectangular sheet layer 104 as shown in FIG. 5. Thus, when the sheet sections 106 are assembled in a rectangular formation on top of the base layer 108 as shown in FIGS. 1 and 3, a small portion of the base layer 108 extends beyond the sheet sections 106 as is clearly shown in FIG. 5.

The flexible base layer 108 can be comprised of, for example, a standard vinyl slip sheet or other flexible fibrous material which is also available from Linoleum$^{(R)}$ City in Hollywood, Calif. The flexible base layer 108 serves to provide a platform which functions to enable the plurality of sheet sections 106 to be assembled together in any of a plurality of attractive geometrical designs. Thus, by affixing the bottom side of each of the sheet sections 106 onto the base layer 108, the accumulation of the sheet sections 106 enables the realization of the geometric designs.

Further, the flexible base layer 108 also provides a support backing to the assembled sheet sections 106 to enable the entire floor covering 100 to be rolled and transported. The bottom side of the sheet sections 106 are typically affixed to the top side of the flexible base layer 108 with a first adhesive layer 110 as shown in FIG. 5. An example of a suitable adhesive to form the first adhesive layer 110 between the sheet sections 106 and the flexible base layer 108 (or other fibrous material) is known in the art as Forbo 511 and is also commercially available at various outlets that trade in Linoleum$^{(R)}$ products. The flexible base layer 108 comprised of the vinyl slip sheet or other fibrous material provides the first adhesive layer 110 a suitable material to adhere to.

Fused to the flexible base layer 108 and to the plurality of outer edges 107 of the sheet sections 106 is a border reducer 112 best shown in FIG. 5 and also in exploded FIG. 2. The border reducer 112 is clearly shown as being wedge-shaped and is available from Futura Industries of ** (Chris Stearns—what city and state is Futura Industries located in) **. The wedge-shaped form of the border reducer 112 is ideally designed for enabling the outer perimeter of the portable area floor covering 100 to interface with the surface of the floor upon which the floor covering 100 is resting. This design helps ensure that individuals are less likely to trip and fall over the floor covering 100. This is the case since the wedge-shaped border reducer 112 provides the floor covering 100 with a smooth transition from the level of the flexible sheet layer 104, i.e., the outer edges 107 of the sheet sections 106, to the surface of the floor upon which the floor covering 100 rests.

The border reducer 112, sometimes referred to as "trim", is a rubberized tile reducer strip, i.e., comprised of an extruded rubber material or liquid rubber that is poured, dried and pulled from a mold. The border reducer 112 as used in the present invention is typically 0.08" gauge. The border reducer 112 is fused to the top surface of the flexible base layer 108 and to the outer edges 107 of the sheet sections 106 by a second adhesive layer 114 as shown in FIG. 5. An adhesive that is suitable for use as the second adhesive layer 114 is known in the art as "Goop" Household Epoxy and is commercially available in the marketplace. The second adhesive layer 114 is a strong epoxy cement that will fuse the rubberized border reducer 112 to the flexible base layer 108 (or other flexible fibrous material) and the outer edges 107 of the sheet sections 106.

Secured to the bottom of the flexible base layer 108 is a padding layer 116 best shown in FIG. 5 but is also clearly visible in exploded FIG. 2. The padding layer 116 provides the portable area floor covering 100 with at least three useful features. First, the padding layer 116 provides a cushioning feature to the floor covering 100 which reduces the stress and burden on the legs of the persons standing thereon. The combination of the flexible sheet layer 104 and the padding layer 116 which is formed from foam rug padding provide the cushioning. Therefore, the portable area floor covering 100 serves as an anti-fatigue mat which is useful in residential and commercial environments such as kitchens, restaurants, hair salons and the like where extending standing is common.

Second, the padding layer 116 being comprised of foam rug padding provides an anti-skid feature that, like the wedge-shaped border reducer 112, contributes to the overall safety features of the present invention. Third, the padding layer 116 contributes to noise suppression so that the overall ambient noise level in the environment is reduced. A suitable example material for use as the padding layer 116 is standard foam rug padding of ⅛", i.e., 0.125" gauge. This material is commercially available in the carpet industry. The padding layer 116 is secured to the bottom of the flexible base layer 108 by a third adhesive layer 118. Any of several known general use adhesives such as, for example, the "Goop" Household Epoxy previously mentioned will be adequate for securing the padding layer 116 to the underneath side of the flexible base layer 108.

The flexible sheet layer 104 can be comprised of Forbo Marmoleum Real(™), a type of Linoleum$^{(R)}$. Although this material is known to be durable, it is subject to scratches, scuffing and damage resulting from everyday wear and tear. In order to minimize the scratches, scuffing and damage to the attractive, colorful and aesthetically pleasing exterior surface of the flexible sheet layer 104, a scuff resistant sealer coating 120 is applied during the manufacturing stage as is shown in FIG. 5. An example of a suitable sealer coating 120 for use with the present invention is known in the art as Taski Ombre which is a high quality liquid transparent sealer manufactured in and commercially available outside of Germany.

Each of the features disclosed hereinabove and relating to the flexible base layer 108, the wedge-shaped border reducer 112, the padding layer 116, the first, second and third adhesive layers 110, 114 and 118, respectively, and the scuff resistant sealer coating 120 are also applicable to the portable area floor covering 100 having the durable flexible sheet layer 104 formed of a single sheet section. The single sheet section of the flexible sheet layer 104 can be comprised of for example, Forbo Marmoleum Real(™), as previously described.

Prior to the manufacturing and fabricating process, a scale drawing of the proposed and final design of the portable area floor covering 100 is created. Suitable materials, i.e., preferably Forbo Marmoleum Real(™), are selected having different colors, shades and cosmetic designs for the project at hand. The plurality of sheet sections 106 (or, in the alternative, the single sheet section of the flexible sheet layer 104) are hand cut and shaped according to the final scale drawing. The edges of each of the sheet sections 106 are sanded to ensure accurate fitting when they are assembled. The plurality of sheet sections 106 are then affixed to the flexible base layer 108 comprised of vinyl or other fibrous material by the first adhesive layer 110. The area floor covering 100 is then subjected to a weighted roller to ensure proper adhering of the sheet sections 106 to the flexible base layer 108.

The border reducer 112 is then cut to specification, i.e., cut to properly fit the perimeter of the area floor covering 100, and fused to the base layer 108 and the outer edges 107 of the sheet sections 106 with the second adhesive layer 114. The surface of the area floor covering 100 is then cleaned and the scuff resistant sealer coating 120 is applied. Thereafter, the padding layer 116 is cut and shaped so that after the padding layer 116 is applied to the bottom of the area floor covering 100, a 2" border of the base layer 108 is visible. The two inch border of the base layer 108 can clearly be seen in FIGS. 4 and 5. The fabrication of the portable area floor covering 100 is thus complete and the steps of the method therefore have been set forth.

Upon completion of the preceding steps, the durable, flexible sheet layer 104 formed of the plurality of sheet sections 106 have been provided wherein each sheet section 106 includes the plurality of outer edges 107. The outer edges 107 of each of the sheet sections 106 have been sanded. The flexible base layer 108 will have been affixed to the bottom side of each of the sheet sections 106 to form the backing for the flexible sheet layer 104. The wedge-shaped border reducer 112 will have been fused to the flexible base layer 108 and to the outer edges 107 of the sheet sections 106 for interfacing with a floor surface. Also, the padding layer 116 will be secured to the bottom side of the flexible base layer 108 to provide cushioning, anti-skid properties and noise suppression to the portable area floor covering 100. Finally, the scuff resistant sealer coating 120 will have been applied to the flexible sheet layer 104.

The present invention provides novel advantages over other floor coverings known in the art. A main advantage of the portable area floor covering 100 of the present invention is that it is durable yet sufficiently flexible to facilitate portability so that it can be easily and conveniently relocated. The floor covering 100 exhibits a robust construction since the flexible sheet layer 104 can be comprised of durable, washable sheet sections 106 of Forbo Marmoleum Real (™), a type of Linoleum$^{(R)}$, and the base layer 108 used to support the sheet sections 106 of the sheet layer 104 can be comprised of flexible vinyl. The padding layer 116 serves to provide cushioning, sound suppression and anti-skid protection and the wedge-shaped border reducer 112 assists in minimizing accidents. Further, the area floor covering 100 exhibits a very attractive and aesthetically pleasing appearance and the sealer coating 120 applied to the flexible sheet layer 104 resists scuffing and staining so that the floor covering 100 is ideal for use in residential and commercial environments. In particular, the area floor covering 100 is very useful in high traffic areas which are subjected to dirt, spills and accumulation of debris such as door entryways, hallways and the like. This is the case since the floor covering 100 is easily cleaned and maintained.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention. Accordingly,

What is claimed is:

1. A portable area floor covering comprising:

a durable, flexible sheet layer formed of a plurality of sheet sections wherein each sheet section includes a plurality of outer edges;

a flexible base layer affixed to a bottom side of each of said sheet sections to form a backing for said durable, flexible sheet layer;

a border reducer fused to said flexible base layer and to said outer edges of said sheet sections, said border reducer being wedge-shaped for interfacing with a floor surface; and a padding layer secured to a bottom side of said flexible base layer to provide cushioning to said portable area floor covering.

2. The portable area floor covering of claim 1 wherein said plurality of sheet sections are each configured as a rectangle.

3. The portable area floor covering of claim 1 wherein said flexible base layer is comprised of vinyl.

4. The portable area floor covering of claim 1 wherein said border reducer is comprised of rubber.

5. The portable area floor covering of claim 1 wherein said padding layer is comprised of foam rug padding.

6. The portable area floor covering of claim 1 wherein said base layer is affixed to the bottom side of said sheet sections with a first adhesive layer.

7. The portable area floor covering of claim 1 wherein said border reducer is fused to said base layer and to said outer edges of said sheet sections with a second adhesive layer.

8. The portable area floor covering of claim 1 wherein said padding layer is secured to a bottom side of said base layer with a third adhesive layer.

9. The portable area floor covering of claim 1 wherein said durable flexible sheet layer further includes a scuff resistant sealer.

10. A portable area floor covering comprising:

a durable, flexible sheet layer formed of a single sheet section wherein said single sheet section includes a plurality of outer edges;

a flexible base layer affixed to a bottom side of said single sheet section to form a backing for said durable, flexible sheet layer;

a border reducer fused to said flexible base layer and to said outer edges of said single sheet section, said border reducer being wedge-shaped for interfacing with a floor surface; and a padding layer secured to a bottom side of said flexible base layer to provide cushioning to said portable area floor covering.

11. A method of constructing a portable area floor covering, said method comprising the steps of:

providing a durable, flexible sheet layer formed of a plurality of sheet sections wherein each sheet section includes a plurality of outer edges;

sanding said plurality of outer edges of each sheet section;

affixing a flexible base layer to a bottom side of each of said sheet sections to form a backing for said durable, flexible sheet layer;

fusing a wedge-shaped border reducer to said flexible base layer and to said outer edges of said sheet sections for interfacing with a floor surface; and securing a padding layer to a bottom side of said flexible base layer to provide cushioning to said portable area floor covering.

12. The method of claim 11 further including the step of applying a layer of scuff resistant sealer on said durable flexible sheet layer.

* * * * *